United States Patent
Dolle et al.

(10) Patent No.: US 7,596,502 B2
(45) Date of Patent: Sep. 29, 2009

(54) SYSTEM AND METHOD FOR REPLACING CONTACT INFORMATION ON A WEBSITE

(75) Inventors: Jason Dolle, Estero, FL (US); Eric Elliston, Ft. Meyers, FL (US); Luan Doan, Naples, FL (US)

(73) Assignee: Agent Shield, Inc., Estero, FL (US)

( * ) Notice: Subject to any disclaimer, the term of this patent is extended or adjusted under 35 U.S.C. 154(b) by 248 days.

(21) Appl. No.: 11/457,692

(22) Filed: Jul. 14, 2006

(65) Prior Publication Data

US 2008/0015874 A1 Jan. 17, 2008

(51) Int. Cl.
*G06Q 30/00* (2006.01)

(52) U.S. Cl. .................................. 705/1; 705/14; 705/26

(58) Field of Classification Search .................. 705/1, 705/14, 26
See application file for complete search history.

(56) References Cited

U.S. PATENT DOCUMENTS

| | | | |
|---|---|---|---|
| 6,314,404 B1 * | 11/2001 | Good et al. .................. 705/1 |
| 6,321,202 B1 | 11/2001 | Raveis, Jr. |
| 6,457,005 B1 * | 9/2002 | Torrey ......................... 707/5 |
| 6,594,633 B1 | 7/2003 | Broerman |
| 6,594,641 B1 | 7/2003 | Southam |
| 6,615,187 B1 | 9/2003 | Ashenmil et al. |
| 6,629,135 B1 | 9/2003 | Ross, Jr. et al. |
| 6,751,596 B1 | 6/2004 | Hastings |
| 6,993,572 B2 | 1/2006 | Ross, Jr. et al. |
| 7,162,436 B1 * | 1/2007 | Eckel, Jr. .................... 705/26 |
| 2002/0072975 A1 * | 6/2002 | Steele et al. ................. 705/14 |
| 2004/0153352 A1 * | 8/2004 | Berns et al. .................. 705/8 |
| 2005/0240432 A1 * | 10/2005 | Jensen ......................... 705/1 |
| 2006/0047530 A1 * | 3/2006 | So et al. ...................... 705/1 |
| 2007/0083403 A1 * | 4/2007 | Baldwin et al. .............. 705/7 |

OTHER PUBLICATIONS

Ina Steiner, Amazon Auctions, zShop and Marketplace, Nov. 18, 2000, AuctionBytes.com.*
Realty.com Launches AgentChoice at National Association of Realtors National Convention & Expo, Nov. 12, 1999, PR Newswire.*

* cited by examiner

*Primary Examiner*—Naresh Vig
(74) *Attorney, Agent, or Firm*—Donald E. Hasse; Ronald J. Richter; Hasse & Nesbitt LLC

(57) ABSTRACT

A system and method that replaces contact information on a real estate development website with contact information for a referring real estate agent. The contact information of the referring real estate agent is stored in an agent database. A specialized link correlates the referring agent's contact information with the development website which, upon activation of the link, targets the web pages of the development website and inserts the contact information of the referring real estate agent in place of the contact information of the developer. A facilitator typically manages the agent database, and identifies both the real estate agent and the developer as customers of the facilitator before the contact information at the development website is replaced.

19 Claims, 1 Drawing Sheet

SYSTEM AND METHOD FOR REPLACING CONTACT INFORMATION ON A WEBSITE

FIELD OF THE INVENTION

The invention relates in general to the use of the Internet for real estate sales, and more particularly to a system and method for replacing the contact information on a real estate development's website with that of a referring real estate agent or brokerage.

BACKGROUND OF THE INVENTION

Currently, many new real estate development projects are emerging to meet the demand for new construction. Developers of real estate, especially the larger developments, go through extensive efforts and research in creating a marketing and branding strategy designed to maximize sales. As part of that marketing campaign, typically a website is created. The Internet has emerged as a critical piece of any developer's marketing strategy, and remains the best source for information on a development. Over 70% of new potential buyers look first on the Internet for their next purchase. New development websites are frequently some of the most cutting edge websites on the Internet today. Indeed, the developer's website can be one of the most effective sales tools with regards to new or pre-construction sales.

New developments typically have an onsite or dedicated in-house sales staff that writes the contracts on the properties for sale. Real estate agents, working for outside brokerages, are typically encouraged to refer clients to this in-house sales staff. If a new construction unit is sold when an outside agent has referred the client, typically a "co-broke" relationship exists, in which the in-house staff makes a commission and the referring real estate agent receives the same amount of commission as the in-house sales staff. Therefore, on a business level, there is typically no conflict of interest between outside agents and the development sales staff.

Although the developer's website is an effective sales tool, and although there is typically no conflict of interest between the developer's in-house staff and referring real estate agents, currently real estate agents are reluctant to add a link from their website to any new development website, for fear of losing leads. Indeed, this fear of losing leads is well-founded, because once a visitor clicks on a link to a development to learn more about it, they will typically communicate with the contact person listed on that site and bypass the realtor who supplied the lead. The real estate agent has effectively been bypassed and most likely has lost a potential commission. Thus, the real estate agent fears sending potential clients to the new development's website because of the very real potential for the visitor to contact the new development's sales office directly. To date, no alternatives have been able to address the loss of the visitor to the new developer.

As a result of the above scenario, realtors and brokerages that would like to work with a certain development project, have the perfect clientele to sell on the project, and want to show their clients information about the project, can completely miss an opportunity to utilize the most valuable informational tool for the development: the development website.

The present invention provides a system and method to solve this problem and provides other benefits, as will become clearer to those skilled in the art from the foregoing description.

SUMMARY OF THE INVENTION

The present invention allows real estate professionals to link to a developer's website without fear of losing leads. The invention provides a link on the real estate agent's website site, email, or advertisement that allows an interested party, whether by clicking on the link or typing it directly into a web browser, to see the linking real estate agent's contact information when visiting the development website.

A first aspect of the invention relates to a method for replacing contact information on a website, the method comprising the steps of: a) receiving and storing contact information relating to a plurality of agents in an agent database; b) receiving and storing identifiers relating to a plurality of real estate development websites in a development database, wherein each development website includes contact information relating to a developer; c) providing a plurality of specialized links, each specialized link including data relating to the contact information for at least one of the plurality of agents and the identifier for at least one of the plurality of real estate development websites embedded therein; d) activating at least one of the plurality of specialized links, activation of the specialized link being operable to pass the data embedded therein to the development website; and e) replacing the contact information relating to the developer on the development website with the contact information of the agent.

A second aspect of the invention relates to a method for replacing contact information on a development website with contact information associated with a referring agent, the method comprising the steps of: a) receiving and storing contact information relating to a plurality of agents in an agent database; b) receiving and storing identifiers relating to a plurality of real estate development websites in a development database, wherein each development website includes contact information relating to a developer; c) providing a plurality of specialized links, each specialized link including data relating to the contact information for at least one of the plurality of agents and the identifier for at least one of the plurality of real estate development websites embedded therein; d) activating at least one of the plurality of specialized links, activation of the specialized link being operable to pass the data embedded therein to an Application Program Interface (API), the API operable to interface with the agent database and the development database; e) verifying via the API that the contact information of the agent is active in the agent database and the identifier of the development website is active in the development database; f) redirecting the data embedded in the specialized link to the development website; and g) replacing the contact information relating to the developer on the development website with the contact information of the agent.

In one embodiment, the developer's website can include contact fill-in forms, wherein any data entered by a visitor in the contact fill-in forms are stored in a lead database. In another embodiment, the lead database is managed by a facilitator who can make the lead database accessible to the real estate agent, the developer, or both.

A third aspect of the invention relates to a system for replacing the contact information associated with a real estate development website with the contact information associated with a referring agent, the system comprising: a) an agent database including contact information associated with a referring agent; b) a development database including an identifier associated with a real estate development website, the development website including contact information relating to a developer; c) a communication link to a visitor computer; and d) a facilitator for creating a specialized link that includes data relating to the contact information for the referring agent and the identifier for the development website embedded therein, wherein activation of the specialized link is operable to pass the data embedded therein to the development website and cause replacement of the contact information relating to the developer thereon with the contact information of the agent.

In one embodiment of the system, the activation of the specialized link is operable to pass the data embedded therein to an Application Program Interface (API), the API operable to execute instructions that perform the steps of: i) interfacing with the agent database and the development database; ii) verifying that the contact information of the agent is active in the agent database and the identifier of the development website is active in the development database; iii) redirecting the data embedded in the specialized link to the development website; and iv) replacing the contact information relating to the developer on the development website with the contact information of the agent, whereby a visitor at the visitor computer views the contact information associated with the referring agent even though the web page visited is that of the development website.

A further understanding of the nature and advantages of the invention will be more fully appreciated with respect to the following drawings and detailed description.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
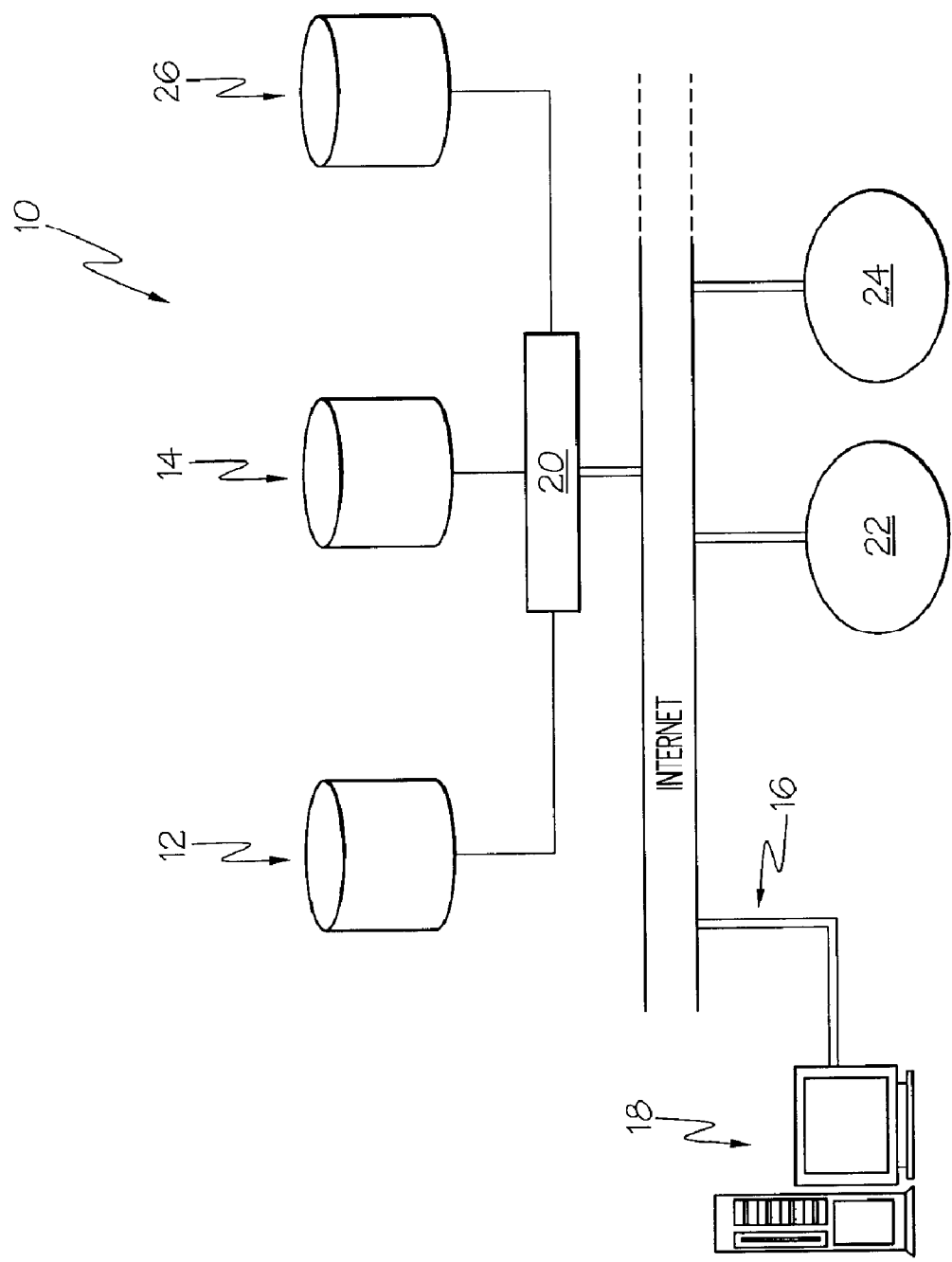
FIG. 1 schematically illustrates the components of the system of the present invention and its mode of interaction.

Definitions:

The terms "agent," "real estate agent," "referring agent," "real estate party" and "brokerage" can be used interchangeably herein, and typically refer to a real estate agent or brokerage who/which has sent a lead/visitor to a developer, but can include any person who refers a lead to a developer. Typically, a referring agent can be any party that is able to receive a compensation for a real estate sale including: a real estate agent, professional, broker, or brokerage.

The term "communication link" refers generally to the Internet and in particular to a link between a computer and a particular website.

The term "contact fill-in form" refers to an electronic document, typically present on a development website, which is completed or filled in by a visitor to that site. While typically presented to a lead/visitor as a "fill-in form", this term can also apply to any situation in which a lead/visitor enters or places information on the development website.

The phrases "contact information" or "contact methods" refers to all methods of communication, including but not limited to: phone numbers, fax, electronic mail, office addresses, contact forms, chat, etc.

The term "developer" as used herein refers to a real estate developer, or any party with an interest in a new or ongoing real estate development project ("development"). As a non-limiting example, a developer may be a real estate company which has rights to sell the new construction on behalf of the party in charge of the development. For purposes of the invention, each development is assumed to have a development website associated therewith, and each development website is assumed to have a developer associated therewith.

The term "facilitator" as used herein refers generally to a third party entity, either a company or an individual, that provides a system for the generation and organization of specialized links for use in linking to development websites by any real estate agent for use in sales lead generation. These links are generated in order to facilitate the replacement of the contact information on the development website with that of the referring real estate agent. The facilitator also typically provides a certification and activation process for real estate development websites which wish to be added to the development database.

The term "identifier" as used herein refers to identifying information unique to a particular development website, and typically allows a visiting computer to locate the development website. Development websites of developers that subscribe to the development database will be given an identifier that allows them to be associated with all agents (or brokerages) that are members of the agent database, and this identifier will be used to generate specialized links for use in contact information replacement on the site.

The terms "link," "URL" (Uniform Resource Locator), and "hyperlink" refer to the core concept/technology that allows the Internet to operate; a URL connects a webpage to either another document (webpage or file), or a different part of the same document, and can comprise, as a non-limiting example, a raw URL link, a name link, or an Icon link, as are known in the art.

The term "specialized link" as used herein refers to a URL, link or hyperlink that includes data relating to the contact information for an agent and the identifier for a development website embedded therein. A specialized link is typically used in marketing efforts intended for use with the present invention, including but not limited to: websites, email, print, television, billboards, etc. The specialized linking process requires cooperation by both the referring agent and the developer. The facilitator can typically provide a processing program, such as an application program interface (API), for the automation of this cooperation.

DETAILED DESCRIPTION OF THE INVENTION

A preferred embodiment of the invention is now described in detail. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The present invention is a system and method for providing a link on a real estate agent's website, email, or Internet advertisement, activation of which (whether by clicking on it or typing it directly into a web browser) leads to a development website as a target but replaces the contact information of the developer with the referring real estate agent's contact information, allowing the real estate agent to maintain control of the lead.

As a non-limiting example of how the system and method typically operates, when a user/visitor/lead is presented with and clicks on a specialized link to a development website, typically present on a referring agent's website or email, the contact information on the development's website is changed to that of the referring agent. The user will see the contact information for that realtor or brokerage, which is typically stored in an "agent database," rather than the contact information of the developer, which is typically stored in a separate "developer database." Also, any contact fill-in forms completed by a user/visitor/lead on the development site will be sent to a "lead database," which is typically accessible to the referring agent rather than the developer, thus eliminating the fear of losing leads and giving real estate professionals more tools to use in making sales and informing clients. A facilitator typically manages the agent, developer and lead databases, and supplies easy methods, typically via an application program interface (API), for agents to generate the specialized links. In one embodiment, the system and method of the invention can be operated independent of a facilitator.

More specifically, a user typically will navigate the Internet using a web browser as is known in the art, and open a webpage for a real estate agent and click on a specialized link to a development website. The user may also come upon this specialized link via a phone number, fax, electronic mail, office address, contact form, or chat screen. Nevertheless, the specialized link contains data in the form of specific variables embedded therein which are used to identify the agent as well as the development. These variables typically are passed, via a querystring, post method, "get" method or any other method of passing information as is known in the art, to a facilitator. If necessary, the variables can be encrypted. An application program interface (API) can be used verify that the agent and the developer are both active "clients" in the system by making sure both have active contact information and identities in the agent and developer databases, respectively.

If the data embedded in the querystring, post or specialized link passes the verification process, it is then passed to the development website. If the data was encrypted, it will be passed in its encrypted form once again within the querystring. When the querystring is received by the development website, it is used to retrieve the agent contact information via the API, and the contact information of the developer on the development website is removed and replaced with the contact information of the agent. The facilitator does not typically control the implementation of the replacement, but does control the API and methods for making the replacement, which are made accessible by the programmer of the development website. There are various methods available in the art for allowing the programmer of the development website to look up or retrieve the relevant agent contact information from the agent database, including but not limited to web services, direct database access, and a webpage returning XML.

In addition, typically any form submissions, including contact fill-in forms or the like, are entered into a lead database. The lead database is typically under the control of the facilitator, who makes the information contained therein available to the referring agent, so long as they are active in the agent database. This allows the referring agent to keep track of the leads that have gone through the referring agent and entered information at the target development website.

The facilitator typically offers a service which specializes in receiving and storing contact information relating to a plurality of agents in an agent database 12. Likewise, this service offers subscriptions to interested developers, and then the facilitator receives and stores identifiers relating to a website of the developer in a development database 14. Each development website typically includes contact information relating to that developer. Typically it is the facilitator which provides a plurality of specialized links 30. As discussed above, each specialized link 30 typically includes data embedded therein, the data relating to the contact information for at least one of the plurality of agents stored in the agent database 12, as well as the identifier stored in the development database 14 for at least one of the plurality of real estate development websites. When the specialized link 30 is activated or clicked 32, the data embedded therein is typically passed to the development website and the contact information relating to the developer is removed and replaced on the development website with the contact information of the agent 34.

In one embodiment, activation 32 of the specialized link 30 passes the data embedded therein to an Application Program Interface (API) 36 managed by the facilitator. The API 36 then interfaces with the agent database 12 and the development database 14, verifies that the contact information of the agent is active in the agent database 12 and that the identifier of the development website is active in the development database 14, and then redirects the data embedded in the specialized link to the development website. When the development website receives the validated link, it operates protocol (i.e. web services, webpage returning XML, etc.) that will replace the contact information relating to the developer on the development website with the contact information of the agent 34.

The invention also is illustrated in FIG. 1, which shows a system for replacing the contact information associated with a real estate development website with the contact information associated with a referring agent. Typically the system comprises an agent database 12, a development database 14, a communication link 16 to a visitor computer 18, and a facilitator 20. The development database typically includes an identifier for at least one development website 22. Typically the specialized link provided by the facilitator 20 can be located on the referring real estate agent's website 24, but can also be provided in an e-mail or advertisement of the referring agent. As noted above, information in the form of submissions, including contact fill-in forms or the like, that are completed at the development website 22 are entered into a lead database 26. The lead database 26 is typically under the control of the facilitator 20, who makes the information contained therein available to the referring agent, so long as they are active in the agent database 12. The agent database 12 typically includes contact information associated with at least one referring agent, and the development database 14 typically includes the contact information and an identifier of the at least one real estate development website 22.

To cause the system 10 to function and thus service a particular agent and development website, the facilitator 20 typically creates a specialized link as described in more detail above. Activation of the specialized link will pass the data embedded therein to an Application Program Interface (API) created by the facilitator 20. The API will then execute instructions that perform the steps of interfacing with the agent database 12 and the development database 14, verifying that the contact information of the agent is active in the agent database 12 and the identifier of the development website 22 is active in the development database 14, redirecting the data embedded in the specialized link to the development website 22; and replacing the contact information relating to the developer on the development website with the contact information of the agent. When this is done, a visitor at the visitor computer 18 views the contact information associated with the referring agent, even though the web page visited is that of the development website 22.

Facilitators typically will bring a development website into the system by certification, which includes a subscription for the developer. This subscription is typically accompanied by a fee to be paid to the facilitator, but can also be provided free-of-charge. Certified development websites typically are required to adhere to a strict set of rules in order to insure that the linking agent's leads are protected. This includes allowing any information received at the developer's website via fill-in forms be stored in a facilitator-controlled lead database. The referring real estate agent, and not the developer, is typically given access to this lead database so that leads originating with a certain referring real estate agent remain coupled to that agent. Developers typically will work with the facilitator to ensure all criteria are met.

Once the facilitator has rigorously inspected and tested the subscribing development website, the facilitator then gives the site an official Certification, adds it to the development database, and provides it with a unique identifier for quick reference within the development database. Further, all referring agents who are active in the agent database are typically notified by the facilitator of the new addition of the development website to the development database. Being facilitator-certified does not mean that the facilitator has control over, or has created, the development website. Rather, the facilitator technology, including the API which handles the methods described herein, is built on existing industry-wide standards, so that the developer's current web team or company can quickly and easily integrate this technology into a new or existing website.

The system and method of the present invention has many advantages over the prior art. For example, real estate agents can link to new developments' websites without fear of losing leads, can increase sales by quickly adding new properties to their web site when they add a new link to a development website, can anticipate that they will never have outdated data about a development (thus increasing their credibility and customer satisfaction), can maintain full control of their leads, can stay on the cutting edge of the market with automatic notices of any new developments or changes to existing ones, and can maximize their own website's effectiveness. Benefits to real estate developers include an increase in sales by being extremely agent inclusive, instant expansion of marketing reach to real estate agents, and potential expansion of their web presence from one site to thousands of agent sites. Developers can also maintain full control and effectiveness of their branding, minimize outdated and potentially incorrect information, keep real estate professionals more informed about their development, and immediately gain exposure through the facilitator's agent notification process.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative system and method, and illustrated examples shown and described. Accordingly, departures may be made from such details without departing from the scope or spirit of the invention.

What is claimed is:

1. A method for replacing contact information on a website, the method comprising the steps of:
   a. receiving and storing contact information relating to a plurality of agents in an agent database;
   b. receiving and storing identifiers relating to a plurality of real estate development websites in a development database, wherein each development website includes contact information relating to a developer;
   c. providing a plurality of specialized links for a visitor at a webpage, each specialized link including data relating to the stored contact information for one of the plurality of agents and the stored identifier for one of the plurality of real estate development websites embedded therein;
   d. presenting the visitor at the webpage with at least one of the plurality of specialized links for activation, activation of the specialized link by the visitor being operable to redirect the visitor to the development website and pass the data embedded therein to the development website; and
   e. replacing the contact information relating to the developer on the development website with the contact information of the agent, whereby the visitor is presented with the agent's contact information at the development website.

2. The method of claim 1, wherein the step of activating at least one of the plurality of specialized links is operable to pass the data embedded therein to an Application Program Interface (API), the API operable to interface with the agent database and the development database, the method further comprising the steps of;
   a. verifying via the API that the contact information of the agent is active in the agent database and the identifier of the development website is active in the development database; and
   b. redirecting the data embedded in the specialized link to the development website.

3. The method of claim 1, wherein a facilitator provides a service which manages the agent database and the development database, and wherein the facilitator provides the specialized links.

4. A method for replacing contact information on a development website with contact information associated with a referring agent, the method comprising the steps of:
   a. receiving and storing contact information relating to a plurality of agents in an agent database;
   b. receiving and storing identifiers relating to a plurality of real estate development websites in a development database, wherein each development website includes contact information relating to a developer;
   c. providing a plurality of specialized links for a visitor at a webpage, each specialized link including data relating to the stored contact information for one of the plurality of agents and the stored identifier for one of the plurality of real estate development websites embedded therein;
   d. presenting the visitor at the webpage with at least one of the plurality of specialized links for activation, activation of the specialized link by the visitor being operable to redirect the visitor to the development website and pass the data embedded therein to an Application Program Interface (API), the API operable to interface with the agent database and the development database;
   e. verifying via the API that the contact information of the agent is active in the agent database and the identifier of the development website is active in the development database;
   f. redirecting the data embedded in the specialized link to the development website; and
   g. replacing the contact information relating to the developer on the development website with the contact information of the agent, whereby the visitor is presented with the agent's contact information at the development website.

5. The method of claim 4, wherein the agent database comprises a plurality of agent accounts, each account including contact information for a particular agent.

6. The method of claim 4, wherein a facilitator provides a service which manages the agent database and the development database, and wherein the facilitator provides the specialized links.

7. The method of claim 6, wherein the development database comprises a plurality of subscriptions, each subscription including identifying information for a particular development website.

8. The method of claim 7, wherein the subscriptions are paid for by the developer.

9. The method of claim 7, wherein the subscriptions are provided free-of-charge to the developer.

10. The method of claim 4, wherein at least one of the specialized links is encrypted, the API being operable to decrypt encrypted links.

11. The method of claim 4, the development website further including contact fill-in forms, wherein any data entered into the contact fill-in forms are stored in a lead database.

12. The method of claim 11, wherein a facilitator provides a service which manages the lead database, the agent database and the development database, and wherein the facilitator provides the specialized links.

13. The method of claim 12, wherein the information stored in the lead database is made accessible by the facilitator to the agent.

14. A system for replacing the contact information associated with a real estate development website with the contact information associated with a referring agent, the system comprising:
   a. an agent database including contact information associated with a referring agent;
   b. a development database including an identifier associated with a real estate development website, the development website including contact information relating to a developer;
   c. a communication link to a visitor computer; and
   d. a facilitator for creating a specialized link for a visitor at a webpage that includes data relating to the contact information for the referring agent and the identifier for the development website embedded therein, wherein activation of the specialized link by the visitor at the webpage is operable to redirect the visitor to the development website and pass the data embedded therein to the development website and cause replacement of the contact information relating to the developer thereon with the contact information of the agent, whereby the visitor is presented with the agent's contact information at the development website.

15. The system of claim 14, wherein activation of the specialized link is operable to redirect the visitor to the development website and pass the data embedded therein to an Application Program Interface (API), the API operable to execute instructions that perform the steps of:
   i. interfacing with the agent database and the development database;
   ii. verifying that the contact information of the agent is active in the agent database and the identifier of the development website is active in the development database;
   iii. redirecting the data embedded in the specialized link to the development website; and
   iv. replacing the contact information relating to the developer on the development website with the contact information of the agent, whereby the visitor at the visitor computer views the contact information associated with the referring agent even though the web page visited is that of the development website.

16. The system of claim 14, the development website further including a contact fill-in form, wherein information entered into the contact fill-in form is stored in a lead database.

17. The system of claim 16, wherein the information stored in the lead database is accessible to the referring agent.

18. The system of claim 14, wherein a facilitator provides a service which manages the lead database, the agent database and the development database.

19. The system of claim 18, wherein the information stored in the lead database is made accessible by the facilitator to the agent.

* * * * *